Patented Feb. 24, 1942

2,274,524

UNITED STATES PATENT OFFICE 2,274,524

METHOD FOR THE SEPARATION OF CHEMICALLY MODIFIED ROSIN ALCOHOLS INTO COMPONENTS

Joseph N. Borglin, Wilmington, Del., assignor to Hercules Powder Company, Wilmington, Del., a corporation of Delaware No Drawing. Original application September 28, 1939, Serial No. 296,946. Divided and this application July 10, 1941, Serial No. 401,794

10 Claims. (Cl. 260—100)

This invention relates to a method for the separation of alcohol derivatives of chemically modified rosins into components, and more particularly the separation of alcohol derivatives of chemically modified rosins into components by treatment with a selective solvent.

Due to the complexity of the chemical structure of rosin, treatments for the production of chemical modifications practically always result in products which are mixtures of two or more chemical compounds. The product may contain unchanged rosin or the rosin may be converted into two or more different materials, or both. The esterification of such a modified product produces a modified rosin ester which, similarly, is a mixture of chemically different esters. Likewise, esterification of rosin and then treatment to produce chemical modification, gives a product which is a mixture of chemically different esters. Similarly, treatment of the modified rosin to produce an alcohol derivative thereof, gives an alcohol which is a mixture of the resin alcohols derived from the components of the modified rosin material. Likewise, treatment of rosin to produce an alcohol and then chemical modification of the rosin alcohol by the procedures utilized in chemically modifying the rosin produces a similar mixture of chemically different resin alcohols.

Thus, for example, the hydrogenation of rosin may result in a mixture of unchanged rosin and dihydro-rosin. More complete hydrogenation results in a mixture of dihydro-rosin and tetrahydro-rosin. The production of a product which is entirely tetrahydro-rosin has so far proved impossible. The esterification of a hydrogenated rosin results in a mixture of rosin esters. Likewise, the hydrogenation of rosin esters results in a mixture of ordinary rosin ester and dihydro-rosin ester or a mixture of dihydro-rosin ester and tetrahydro-rosin ester. Similar mixtures exist in the alcohol derivatives of the hydrogenated rosin.

The separation of the chemically different components of the chemically modified rosins or of the ester and alcohol derivatives of such rosins has heretofore been practically impossible, and the various commercial products have been complex mixtures of compounds of different chemical structure. No successful method for separating the components of such mixtures has been developed, in spite of the fact that it has been fully realized that such separation would be of great value from a commercial standpoint, as well as from a scientific standpoint.

Now, I have found that I can separate alcohol derivatives of chemically modified rosins into their components by a method which is relatively simple, efficient and adaptable to commercial operation. I accomplish this by treating an alcohol derivative of chemically modified rosin with a substance selected from the group of substances now known to the art to be selective solvents for the visible and latent color bodies of rosin.

The process in accordance with this invention consists of treating an alcohol derivative of a modified rosin with a solvent which is a selective solvent for the color bodies of rosin, separating the selective solvent from the undissolved component of the alcohol derivative of the modified rosin and recovering the component of the alcohol derivative of the modified rosin dissolved therein, as, for example, by evaporating the selective solvent. This process can be repeated as many times as necessary to produce the desired separation of the components.

In carrying out this method, the alcohol derivatives of the modified rosins may or may not be first dissolved in a solvent therefor which is immiscible with the selective solvent which is used. Ordinarily, it will be found convenient to use such a solvent, particularly if the alcohol derivative of the modified rosin treated is a solid at the temperature of treatment. When it is desired to use a solvent for the alcohol derivative of the modified rosin, the procedure in accordance with this invention will consist of dissolving the alcohol derivative of the modified rosin in the solvent, contacting the solution so formed with a selective rosin color body solvent immiscible therewith, separating the two solutions thus formed, and recovering a component of the alcohol derivative of the modified rosin from each solution as, for example, by evaporating the respective solvents, preferably under reduced pressure. This procedure may be repeated as many times as desired.

After separating the alcohol derivative of the modified rosin into components by the above procedure, each component may be further purified by crystallization from suitable solvents, fractionation under reduced pressure, contacting with an absorbent, such as, fuller's earth, kieselguhr, activated carbon etc.

The alcohol derivative of a modified rosin which I may treat in accordance with this invention may be an alcohol derivative of any rosin which has been treated to modify its chemical structure so that the resultant product is a mixture of two or more chemically different substances. The hydrogenation of rosin in the presence of a suitable catalyst according to methods known to the art produces such a modified rosin. The treatment of a hydrogenated rosin to produce an alcohol derivative, likewise, produces an alcohol which is a mixture of the resin alcohols derived from the different components of the hydrogenated rosin as well as non-alcoholic impurities present. Similarly, hydrogenation of a rosin alcohol gives a mixture of two or more chemically different substances. The alcohol derived from hydrogenated wood rosin, for example, may contain dihydroabietyl alcohol and tetrahydroabietyl alcohol among other constituents.

The polymerization of rosin to increase its molecular weight and melting point by treatment with a polymerizing agent, for example, volatile metal halides, as, boron trifluoride, zinc chloride, stannic chloride, aluminum chloride, ferric chloride; mineral acids, as, sulfuric acid, phosphoric acid; fuller's earth; hydrogen fluoride; acid salts, as sodium acid sulfate, etc.; metallic silicon; hydro fluoro-boric acid; etc., according to methods known to the art, produces such a modified rosin. The treatment of the polymerized rosin to produce an alcohol derivative, for example, hydrogenation, produces an alcohol which is a mixture of the resin alcohols derived from the different components of the polymerized rosin as well as non-alcoholic impurities present. Similarly, polymerization of a rosin alcohol gives a mixture of two or more chemically different substances.

Again, the treatment of rosin with a suitable catalyst, as, for example, a hydrogenation catalyst, as nickel, nickel chromite, platinum, palladium, etc., at an elevated temperature of, for example, from about 150° C. to about 200° C. and without reaction between the rosin and any added substance, to produce an intra-and intermolecular rearrangement within the hydrocarbon nucleous of the rosin with a reduction in the apparent unsaturation as disclosed in U. S. Patent No. 2,154,629, issued April 18, 1939 to Edwin R. Littmann produces a modified rosin which may be used in the preparation of an alcohol derivative to be treated in accordance with this invention. Such modified rosins will hereinafter be termed "Hyex" rosins. The treatment of the "Hyex" rosin to produce an alcohol derivative produces an alcohol which is a mixture of the resin alcohols derived from the different components of the "Hyex" rosin as well as non-alcoholic impurities present. Similarly, "Hyex" treatment of a rosin alcohol gives a mixture of two or more chemically different substances.

The alcohol derivatives of modified rosins which I treat in accordance with this invention may be the alcohol derivatives of modified rosins produced from any grade of wood or gum rosin which has been treated to modify its chemical structure so that the modified rosin resulting is a mixture of two or more chemically different materials. The alcohol derivatives of the modified rosins may be prepared from the modified rosins in any suitable manner such as by hydrogenation of the modified rosin under conditions which are satisfactory for alcohol formation. Alternatively, a rosin alcohol may be produced from rosin or a rosin ester by suitable hydrogenation treatment and the resulting rosin alcohol submitted to a treatment which will effect a modification of the rosin nucleus of the rosin alcohol.

The selective solvent which I use in accordance with this invention may be any of the various selective solvents for the visible and latent color bodies of rosins and rosin esters heretofore known. Thus, I may use furfural, furfuryl alcohol, a chlorohydrin, as ethylene chlorohydrin, propylene chlorohydrin, etc., aniline, phenol, resorcinol, ethylene glycol, propylene glycol, butylene glycol, diethylene glycol, trimethylene glycol, glycerol, butyl glycerol, ethyl formate, methyl acetate, methyl formate, methyl orthonitrobenzoate, methyl furoate, alkyl formate, monoacetin, diacetin, triacetin, ethylene glycol monoacetate, methanol, hydroxyl alkyl amine, as triethanolamine, a solution of oxalic acid in water or in methanol, ethanol or other lower aliphatic alcohol, ethylene glycol monoethyl ether, or other immiscible glycol ether, ethylene glycol monoacetate, or other immiscible glycol ester, methyl thiocyanate, ethyl thiocyanate, acetonitrile, acetic acid, acetic anhydride, p-chloroaniline, resorcinol plus hydrosulphite, ethylene glycol diacetate, glycerol diacetate, resorcinol monoacetate, resorcinol diacetate, phenyl acetate, furfuryl acetate, ethylidine diacetate, n-propyl furoate, ethyl glycollate, methyl citrate, ethyl tartrate, ethyl malonate, methyl maleate, dimethyl phthalate, benzyl formate, monobutyrin, ethyl carbonate, methyl lactate, diethyl oxalate, methyl andipate, hydroxyhydroquinone triacetate, methyl chlorocarbonate, propylene glycol monoacetate, hydroquinone diacetate, catechol monoacetate, guaiacyl acetate, methyl glutarate, ethyl oxalate, benzyl acetate, diethyl glutacoate, ethyl lactate, diethyl phthalate, ethyl anisate, methyl salicylate, methyl cinnamate, methyl mandelate, methyl acrylate, ethyl oxamate, methyl succinate, ethyl propiolate, ethyl malate, methoxy-benzaldehyde, guaiacol, anisidin, nitroanisol, dichloroethyl ether, methoxy acetic acid, methoxybenzyl alcohol, liquid sulfur dioxide, nitromethane, etc., or mixtures of such refining agents which are chemically non-reactive, etc.

The solvent in which I may dissolve the alcohol derivative of the modified rosin before contacting it with a selective solvent may be any solvent for the alcohol derivative of the modified rosin which is immiscible and non-reactive with the selective solvent used. Thus, I may use a petroleum hydrocarbon solvent, such as, for example, gasoline, petroleum ether, a normally gaseous petroleum hydrocarbon held in liquid phase by elevated pressure, low temperature, or both. The concentration of the alcohol derivative of the modified rosin in such a solution may be within the range of about 5% to about 80% by weight, and desirably within the range of about 15% to about 30% by weight.

The temperature at which the process in accordance with my invention may be carried out is dependent upon the selective solvent employed and will be within the range of about −40° C. to about +60° C. In any case the temperature used will be such that the selective solvent is a liquid under the pressure used.

In the embodiment of my process in which an alcohol derivative of a chemically modified rosin is dissolved in a solvent therefor before it is contacted with a selective solvent, the solution so formed may have a concentration within the range of about 5% to about 40%, by weight. Usually I prefer to use a solution having a concentration within the range of about 10% to about 25% by weight.

The number of washes employed in my process may be varied in accordance with the results desired, and it will be appreciated that the greater the number of washes given the sharper will be the separation of the components of the alcohol derivative of the chemically modified rosin treated.

As illustrations of the practical adaptation of the method in accordance with this invention, I may cite the following:

Example I

The alcohol derivative of polymerized rosin was prepared by hydrogenating a polymerized rosin which had been polymerized by treatment with sulfuric acid. The hydrogenation was carried out with use of a copper chromite catalyst at a temperature of 275–300° C. at a maximum hydrogen pressure of 1900–2300 lbs./sq. in. Three portions of 140 grams each of a 25% solution of the alcohol in gasoline were counter-currently washed at room temperature (25° C.) with first a 50 cc. portion of furfural, then two 39 cc. portions, a 35 cc. portion and finally three 25 cc. portions of furfural. The gasoline solutions and the combined furfural wash solutions were evaporated under reduced pressure to recover the components dissolved in each. The results obtained are given in Table 1.

Table 1

|  | Refractive index 20° C. | Hydroxyl | Acid No. | Yield |
|---|---|---|---|---|
|  |  | Per cent |  | Per cent |
| Original alcohol from polymerized rosin | 1.5382 | 3.3 | 34.5 |  |
| Alcohol from gas. sol. #1 | 1.5341 | 1.7 | 22.5 | 14.9 |
| Alcohol from gas. sol. #2 | 1.5359 | 2.2 | 30.0 | 20.4 |
| Alcohol from gas. sol. #3 | 1.5358 | 2.2 | 32.0 | 22.5 |
| Alcohol from combined furfural washes | 1.5478 | 3.8 | 40.5 | 42.2 |

The characteristics shown above demonstrate that the original alcohol has been separated into components of chemically different characteristics.

Example II

Three portions of 140 grams each of the 25% gasoline solution of the alcohol derivative of polymerized rosin used in Example I were counter-currently washed at room temperature with first a 50 cc. portion of 85% aqueous phenol, then a 30 cc. portion, two 25 cc. portions and finally two 20 cc. portions of 85% aqueous phenol. The three gasoline solutions and the combined phenol washes were evaporated under reduced pressure to recover the components dissolved in each. The results obtained are given in Table 2.

Table 2

|  | Refractive index 20° C. | Hydroxyl | Acid No. | Yield |
|---|---|---|---|---|
|  |  | Per cent |  | Per cent |
| Original alcohol from polymerized rosin | 1.5382 | 3.3 | 34.5 |  |
| Alcohol from gas. sol. #1 | 1.5323 | 1.1 | 19.0 | 9.5 |
| Alcohol from gas. sol. #2 | 1.5357 | 2.2 | 26.5 | 16.2 |
| Alcohol from gas. sol. #3 | 1.5354 | 2.4 | 29.5 | 17.1 |
| Alcohol from combined phenol washes | 1.5409 | 4.6 | 61.0 | 57.2 |

An examination of the above data shows that as a result of the phenol washes the alcohol derived from polymerized rosin has been separated into components having chemically different characteristics.

Example III

Three portions of 140 grams each of the 25% gasoline solution of the alcohol derivative of polymerized rosin used in Example I were counter-currently washed at room temperature with first a 75 cc. portion of methyl thiocyanate, then successive portions of 40 cc. and 30 cc. followed by four 25 cc. portions of methyl thiocyanate. The three gasoline solutions and the combined methyl thiocyanate washes were evaporated under reduced pressure to recover the components dissolved in each. The results obtained are shown in Table 3.

Table 3

|  | Refractive index 20° C. | Hydroxyl | Acid No. | Yield |
|---|---|---|---|---|
|  |  | Per cent |  | Per cent |
| Original alcohol from polymerized rosin | 1.5382 | 3.3 | 34.5 |  |
| Alcohol from gas. sol. #1 | 1.5332 | 1.6 | 28.0 | 9.8 |
| Alcohol from gas. sol. #2 | 1.5358 | 2.5 | 34.0 | 19.0 |
| Alcohol from gas. sol. #3 | 1.5382 | 3.0 | 34.5 | 20.5 |
| Alcohol from combined methyl thiocyanate washes | 1.5434 | 3.4 | 33.0 | 50.7 |

The characteristics shown in Table 3 illustrate the separation of the alcohol derivative of polymerized rosin into components of chemically different characteristics by the methyl thiocyanate washes.

It will be understood that the above examples and details of operation are given by way of illustration only, and that the scope of my invention as herein broadly described and claimed is in no way limited thereby.

Where in the appended claims I have used the term "polymerized rosin alcohol" it will be understood that I mean a rosin alcohol in which the rosin nucleus has undergone a polymerization modification.

This application forms a division of my application, Serial No. 296,946, filed September 28, 1939, entitled "Method for the separation of chemically modified rosin alcohols into components," which is in turn a continuation-in-part of my application, Serial No. 160,725, filed August 24, 1937, entitled "Method for the separation of chemically modified rosins and their esters into components," now U. S. Patent No. 2,191,306.

What I claim and desire to protect by Letters Patent is:

1. The method of separating a polymerized rosin alcohol into its components which comprises dissolving the polymerized rosin alcohol in a solvent therefor, contacting the solution so formed with a selective rosin color-body solvent immiscible with the said solution, separating the selective solvent therefrom and recovering a component of the polymerized rosin alcohol from each of the resulting solutions.

2. The method of separating a polymerized rosin alcohol into its components which comprises dissolving the polymerized rosin alcohol in a solvent therefor, contacting the solution so formed with a selective rosin color-body solvent immiscible with the said solution, separating the selective solvent therefrom and recovering a component of the polymerized rosin alcohol from each of the resulting solutions by evaporating the solvent.

3. The method of separating a polymerized rosin alcohol into its components which comprises dissolving the polymerized rosin alcohol in a solvent therefor, contacting the solution so formed with furfural, separating the furfural therefrom and recovering a component of the polymerized rosin alcohol from each of the resulting solutions by evaporating the solvent.

4. The method of separating a polymerized rosin alcohol into its components which comprises dissolving the polymerized rosin alcohol in a solvent therefor, contacting the solution so formed with phenol, separating the phenol therefrom and recovering a component of the polymerized rosin alcohol from each of the resulting solutions by evaporating the solvent.

5. The method of separating a polymerized rosin alcohol into its components which comprises dissolving the polymerized rosin alcohol in a solvent therefor, contacting the solution so formed with an alkyl thiocyanate, separating the alkyl thiocyanate therefrom and recovering a component of the polymerized rosin alcohol from each of the resulting solutions by evaporating the solvent.

6. The method of separating a polymerized rosin alcohol into its components which comprises dissolving the polymerized rosin alcohol in a petroleum hydrocarbon solvent, contacting the solution so formed with a selective rosin color-body solvent immiscible with the said solution, separating the selective solvent therefrom and recovering a component of the polymerized rosin alcohol from each of the resulting solutions by evaporating the solvent.

7. The method of separating a polymerized rosin alcohol into its components which comprises dissolving the polymerized rosin alcohol in a petroleum hydrocarbon solvent, contacting the solution so formed with furfural, separating the furfural therefrom and recovering a component of the polymerized rosin alcohol from each of the resulting solutions by evaporating the solvent.

8. The method of separating a polymerized rosin alcohol into its components which comprises dissolving the polymerized rosin alcohol in a petroleum hydrocarbon solvent, contacting the solution so formed with phenol, separating the phenol therefrom and recovering a component of the polymerized rosin alcohol from each of the resulting solutions by evaporating the solvent.

9. The method of separating a polymerized rosin alcohol into its components which comprises dissolving the polymerized rosin alcohol in a petroleum hydrocarbon solvent, contacting the solution so formed with an alkyl thiocyanate, separating the alkylthiocyanate therefrom and recovering a component of the polymerized rosin alcohol from each of the resulting solutions by evaporating the solvent.

10. The method of separating a polymerized rosin alcohol into its components which comprises dissolving the polymerized rosin alcohol in a solvent therefor, contacting the solution so formed countercurrently with a selective rosin color-body solvent immiscible with the said solution, separating the selective solvent therefrom and recovering a component of the polymerized rosin alcohol from each of the resulting solutions by evaporating the solvent.

JOSEPH N. BORGLIN.